United States Patent [19]
Ballard

[11] Patent Number: 5,409,240
[45] Date of Patent: Apr. 25, 1995

[54] SEAL WITH SELF-LUBRICATING CONTACT SURFACE

[75] Inventor: Michael J. Ballard, Baton Rouge, La.
[73] Assignee: Unilab Bearing Protection Company, Inc., Baton Rouge, La.
[21] Appl. No.: 975,624
[22] Filed: Nov. 12, 1992
[51] Int. Cl.$^6$ ............................................. F16J 15/40
[52] U.S. Cl. ..................................... 277/38; 277/96.2
[58] Field of Search ............................. 277/38–41, 277/81 R, 85, 92, 93 R, 935 D, 96, 96.2, 165

[56] References Cited

U.S. PATENT DOCUMENTS

| | | | |
|---|---|---|---|
| 2,367,403 | 1/1945 | Kesatka | 277/39 |
| 2,420,040 | 5/1947 | Frisby et al. | 277/40 |
| 2,888,281 | 5/1959 | Ratti | 277/38 |
| 3,515,393 | 6/1970 | Metcalfe | 277/96.2 |
| 3,636,824 | 1/1972 | Clark | 277/165 |
| 4,002,479 | 1/1977 | Suzuki et al. | 96/114.1 |
| 4,466,619 | 8/1984 | Adams | 277/15 |
| 4,484,754 | 11/1984 | Ballard | 277/53 |
| 4,576,383 | 3/1986 | Ballard | 277/53 |
| 4,655,462 | 4/1987 | Balsells | 277/164 |
| 4,655,945 | 4/1987 | Balsells | 252/124 |
| 4,685,684 | 8/1987 | Ballard | 277/57 |
| 4,934,666 | 6/1990 | Balsells | 267/1.5 |

FOREIGN PATENT DOCUMENTS 1403233  8/1975  United Kingdom ............. 277/40
0565649  11/1994  United Kingdom ............. 277/39

OTHER PUBLICATIONS

Modern Plastics Encyclopedia, 1988–McGraw-Hill, R. E. Fibeat Fluorocarbon Series 409097/22.

Primary Examiner—Daniel G. DePumpo
Attorney, Agent, or Firm—Robert C. Tucker; William David Kiesel

[57] ABSTRACT

A seal between a housing and a rotatable shaft is provided, comprising a first ring member generally concentric with a rotatable shaft, the first ring member being attachable to the shaft in a non-rotatable position relative to the shaft, the first ring member further having an annular self-lubricating sealing surface facing away from the first ring member; and wherein the sealing surface is adapted to face a fixed annular surface and to slidably and sealingly engage the fixed annular surface when the first ring member is biased toward the fixed surface. The self-lubricating surface may be provided on a sealing ring which is biased against the fixed surface. The self-lubricating surface, sealing ring and/or first ring member may be constructed of a fluoroplastic material such as glass filled polytetrafluoroethylene. The fixed surface may be provided on a second ring member, enabling the seal to function as a cartridge unit.

5 Claims, 7 Drawing Sheets

SEAL WITH SELF-LUBRICATING CONTACT SURFACE

BACKGROUND OF THE INVENTION

1. Field of the Invention

This invention relates generally to seals between a housing and a rotatable shaft and, more particularly, to such seals in which a rotatable surface sealingly contacts a fixed surface.

2. Prior Art

Many industries require the use of machines in which a rotatable shaft is contained by a housing. The housing usually contains lubricated bearings and sometimes additional attachments to the shaft such as turbine blades or gears. There are many types of seals provided between a shaft and a housing so as to prevent the leakage of lubricants from the housing and/or to prevent external contaminants from entering the housing along the shaft. In high speed operations of such rotating shaft mechanisms, contaminants to the internal lubricant result in increased wear, costly replacement of parts and, consequently, down time for the mechanism.

It is known to provide a sealing ring assembly comprising a first ring fixed to the housing and a second ring exterior to the housing and fixed to rotate with the shaft. Such an assembly is disclosed by U.S. Pat. No. 4,002,479, invented by David C. Orlowski and issued on May 10, 1977. Such seals, known as "labyrinth" seals, provide protection to internal parts by creating a labyrinth through which contaminants must pass to reach internal parts. During periods when the shaft is not rotating, labyrinth seals necessarily, by their nature, provide a path through which contaminants may reach internal parts. This failing has heretofore been accepted as the norm in exchange for satisfactory performance during rotation coupled with size considerations, ease of installation and replacement (including the replacement of lip seals with labyrinth seals) and relatively low unit cost. Improvements in the art were made by Michael J. Ballard, the inventor herein, and disclosed in U.S. Pat. Nos. 4,484,754, 4,685,684 and 4,576,383. The Ballard patents also provide for additional protection created by the dynamics of the seal during rotation.

Prior art labyrinth seals do not provide a "positive" seal, that is, a constant surface to surface contact which prevents contaminants from entering a protected environment. Prior art positive seals include complex mechanical seals, such as the mechanical seal disclosed in U.S. Pat. No. 4,466,619 to Adams, as well as many others. Prior art mechanical seals utilize a stationary sealing face and a rotatable sealing face which are urged together to form a seal. The faces are manufactured from a hardened material which is polished, or "lapped", to a high degree of flatness, such that the surfaces provide a seal when urged together by springs or other resilient means. Mechanical seals occupy a large volume in order to accommodate the numerous complex parts required for the seal to operate. Further, the sealing surfaces must be lubricated and cooled, either by the working fluid contained by the seal or by a separate barrier fluid. Thus, mechanical seals are impractical for replacement of labyrinth seals, which occupy much less volume, and which are not lubricated by the working fluid or a barrier fluid.

However, it is highly desirable to provide a positive seal for protection of bearings and other internal parts while maintaining the size and relatively low cost of labyrinth seals.

SUMMARY OF THE INVENTION

Considering the above, it is an object of this invention to provide a ring seal between a housing and a rotatable shaft which includes a self-lubricating sealing surface which maintains contact with another surface, but requires no lubricating fluid or expensive polishing of the contact surfaces.

Still another object of this invention is to provide such a seal which requires relatively little time and effort to install and remove, and which may be installed as a replacement for labyrinth and/or lip seals.

Still another object of this invention is to provide such a seal that will require relatively little service and infrequent replacement.

Still further objects and advantages of this invention shall become apparent from the ensuing description of the invention.

Accordingly, a seal between a housing and a rotatable shaft is provided, comprising a first ring member generally concentric with a rotatable shaft, the first ring member being attachable to the shaft in a non-rotatable position relative to the shaft, the first ring member further having an annular self-lubricating sealing surface facing away from the first ring member; and wherein the sealing surface is adapted to face a fixed annular surface and to slidably and sealingly engage the fixed annular surface when the first ring member is biased toward the fixed surface. The self-lubricating surface may be provided on a sealing ring which is biased against the fixed surface. The self-lubricating surface, sealing ring and/or first ring member may be constructed of a fluoroplastic material such as glass filled polytetrafluoroethylene. The fixed surface may be provided on a second ring member, enabling the seal to function as a cartridge unit.

DETAILED DESCRIPTION OF PREFERRED EMBODIMENTS OF THE INVENTION

Figure 1:
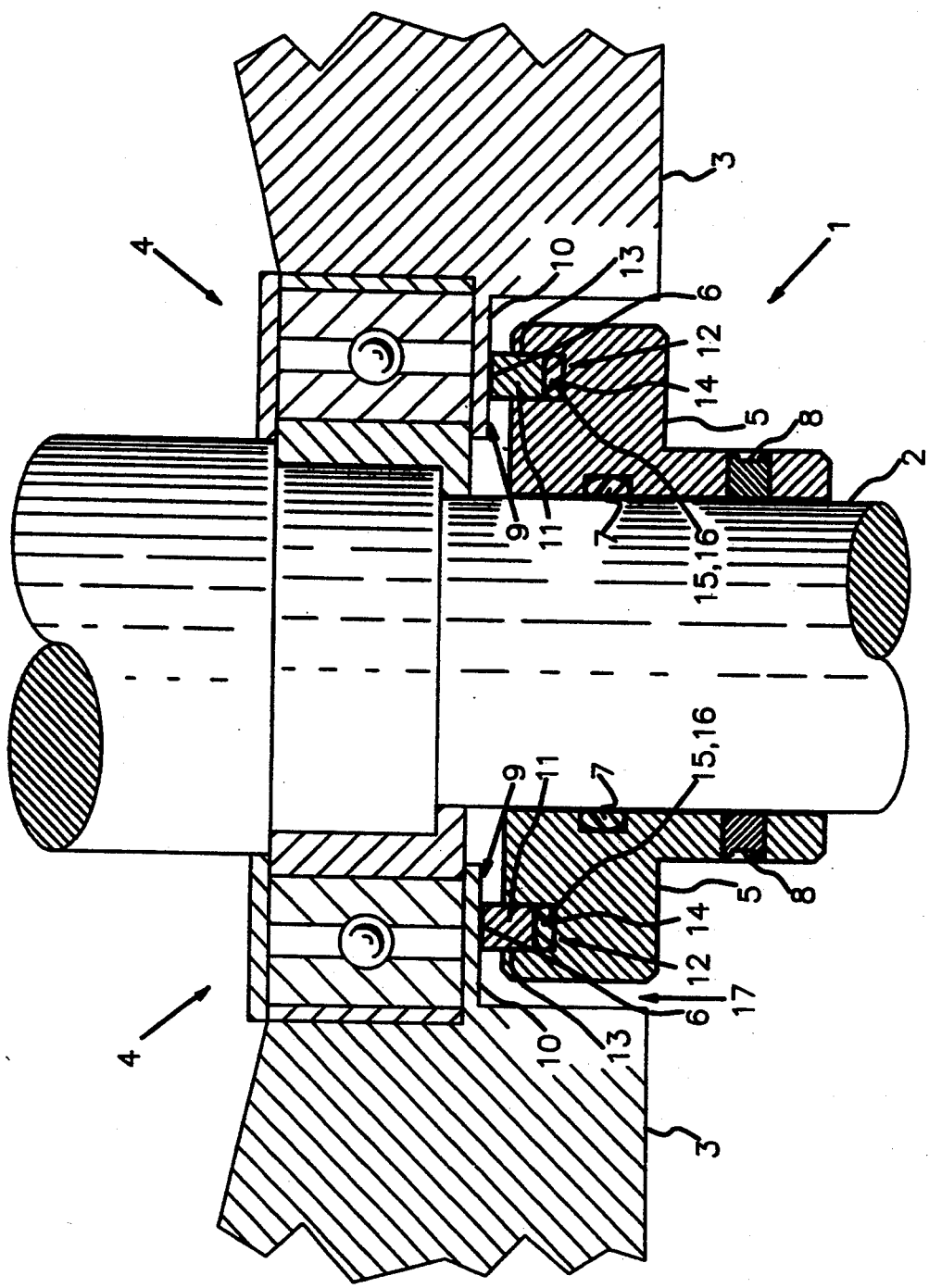
FIG. 1 is a sectional view of an embodiment of the invention installed on a shaft.

FIG. 1 illustrates a typical setting in which the invention may be used, where a rotatable shaft 2 passes through housing 3. In such an environment the interior of housing 3 must be sealed in order to prevent entry of external contaminants which would enter along the shaft 2 and damage internal components, such as bearing 4. The invention, generally denoted as 1, serves to provide such a seal.

As shown in FIG. 1, a major component of the invention 1 and preferred embodiments thereof is first ring member 5 having a self-lubricating sealing surface 6 facing away from first ring member 5. First member 5 is generally concentric with shaft 2 and is held fixedly and sealingly in place on shaft 2 in a non-rotatable position relative to shaft 2. The non-rotative position of first member 5 relative to shaft 2 is maintained by an o-ring 7 (contained in groove 63 on first member 5) and/or set screws 8. Annular self-lubricating sealing surface 6 faces away from first member 5. Sealing surface 6 is adapted to face a fixed annular surface 9, such as an outer annular surface 10 of housing 11. Sealing surface 6 is adapted to slidably and sealingly engage fixed annular surface 9 when first member 5 is biased toward fixed annular surface 9. First ring member 5 is biased toward fixed surface 9 by pushing first member 5 onto shaft 2 such that sealing surface 6 contacts fixed surface 10, and then fixing the position of first member 5 on shaft 2 by tightening set screws 8.

Self-lubricating sealing surface 6 is preferably constructed of a fluoroplastic material having self-lubricating qualifies. It has been found that polytetrafluoroethylene (PTFE) is an excellent material from which to construct sealing surface 6. It is believed that a fluoroplastic coating may be used to form sealing surface 6. However, it is preferred that sealing surface 6 is provided on a sealing ring 11 generally concentric with first member 5. Sealing ring 11 may be constructed entirely of a resilient or semi-resilient fluoroplastic material such as PTFE, and preferably is constructed of a fluoroplastic material including a structural reinforcing aggregate, such as glass filled PTFE sold as Fluorocarbon Series 409097/22 minimum glass filled compounds. Glass filled PTFE provides excellent structural integrity coupled with the self-lubricating qualities of PTFE.

A means 12 for holding a sealing ring is provided on first ring member 5 in order to hold sealing ring 11 in a non-rotative position with respect to first member 5. Preferably, means 12 comprises an annular groove 13 having a base 14, and a resilient member 15 interposed in groove 13 between base 14 and sealing ring 11. Groove 13 is shaped to matingly and receive sealing ring 11, preferably with a forced fit so as to tightly contain sealing ring 11. Resilient member 15, such as an o-ring 16, serves not only to grip sealing ring 11, but also to bias sealing ring 11 outward from base 14 toward fixed surface 9.

Figure 2:
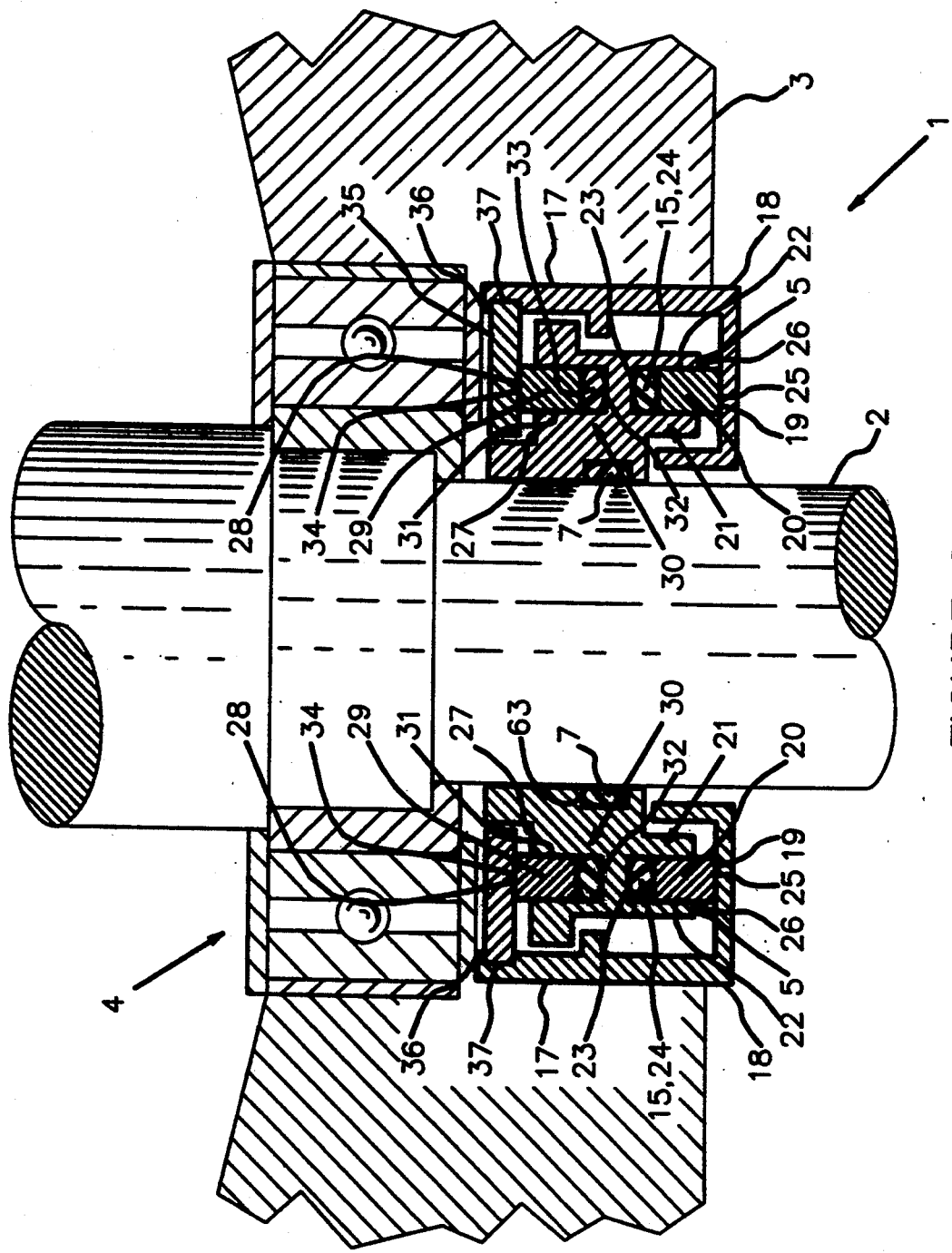
FIG. 2 is a sectional view of a preferred embodiment of the invention installed on a shaft.
Figure 3:
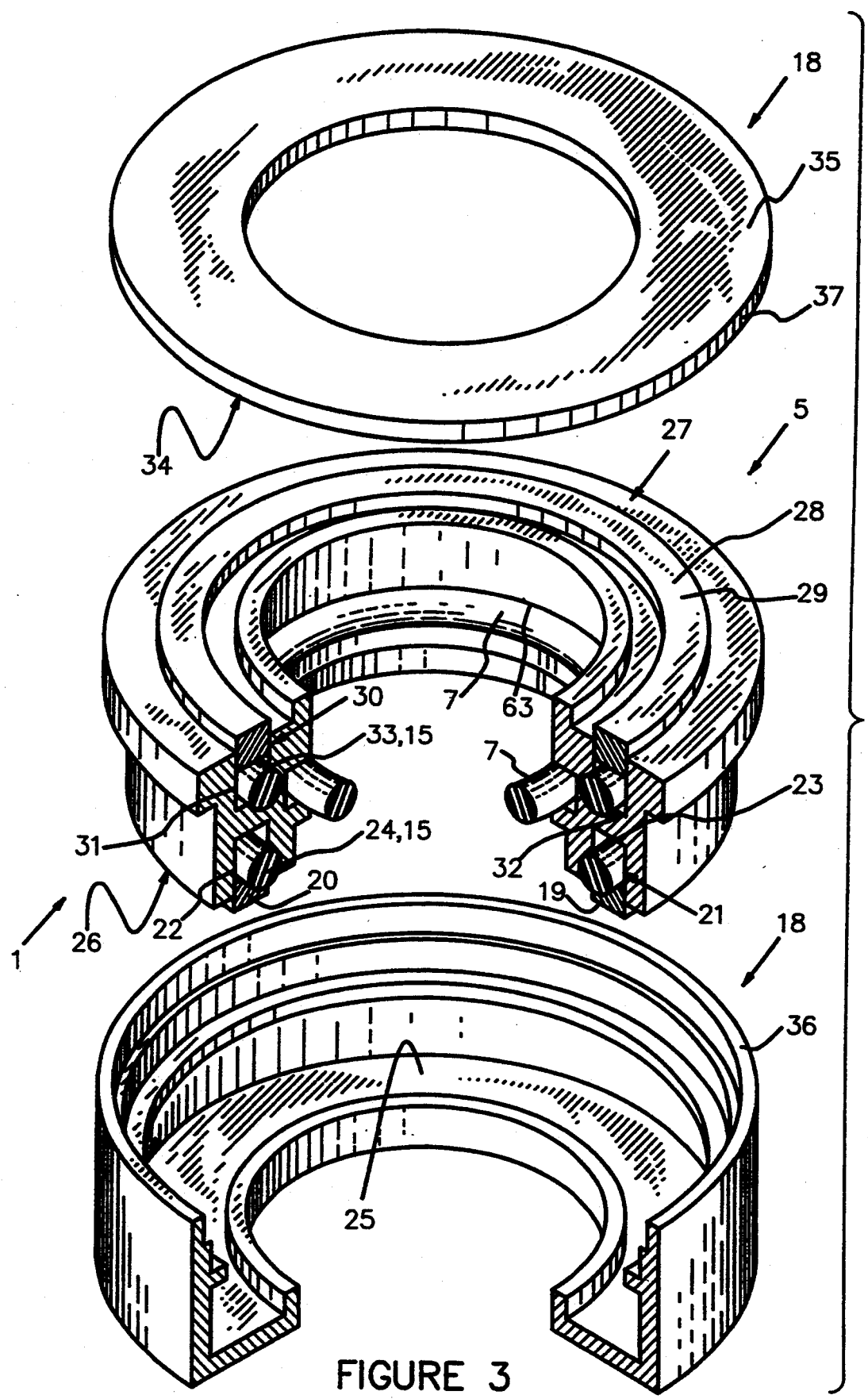
FIG. 3 is an exploded perspective view of the embodiment of the invention shown in FIG. 2.
Figure 4:
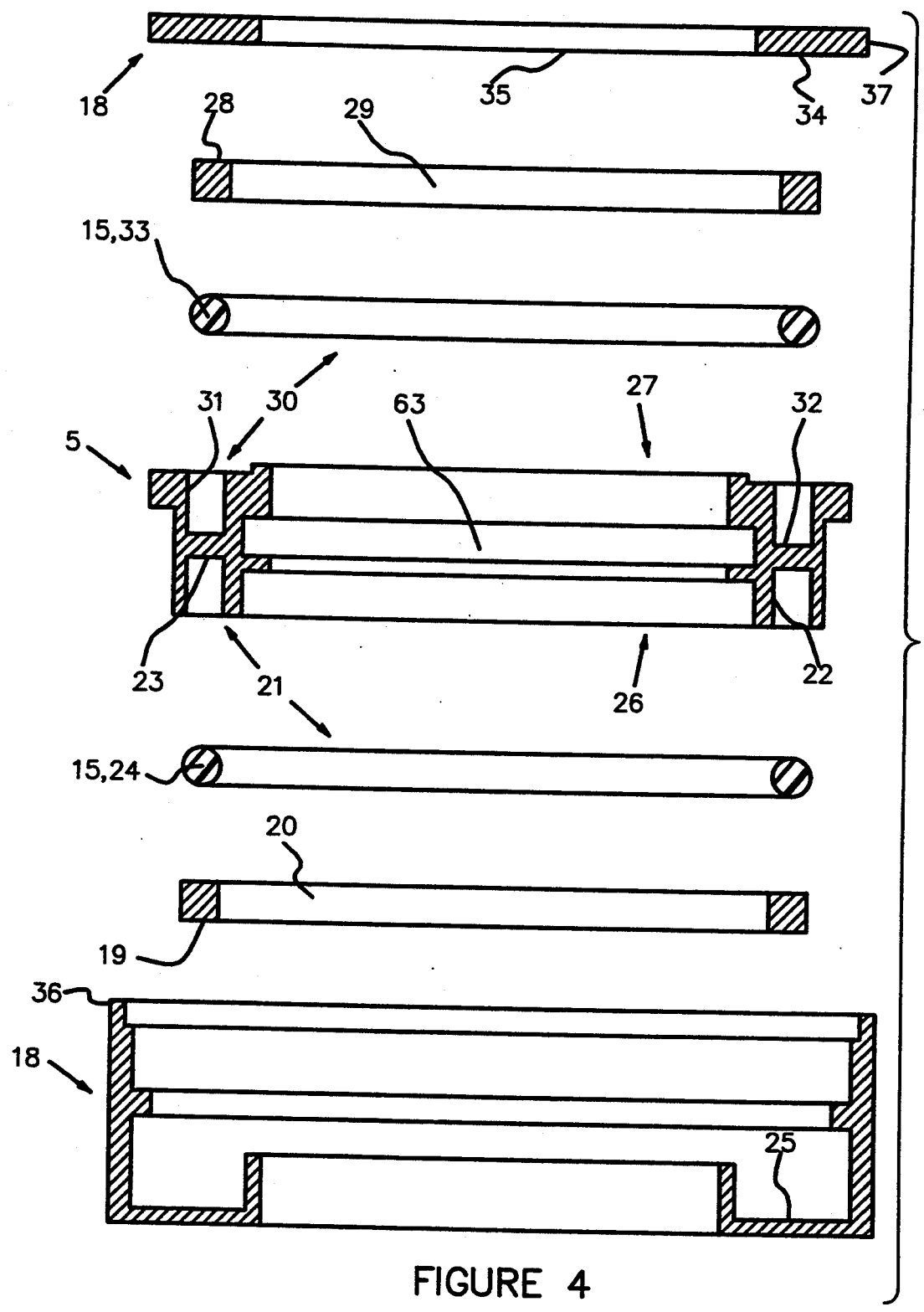
FIG. 4 is an exploded sectional view of the embodiment of the invention shown in FIG. 3.

A more preferred embodiment of the invention 1 is shown in FIGS. 2-4, wherein the seal 1 is provided in a single cartridge unit which will matingly fit into a recess 17 in housing 3. In this embodiment a second ring member 18 is provided. Second ring member 18 is generally concentric with shaft 2 and is attachable in a non-rotatable position with respect to housing 3, preferably by a press fit into recess 17, although a flanged connection to housing 3 may be preferred in situations where internal housing pressure could force seal 1 from recess 17. First ring member 5 has a first side 26 and a second side 27, and is provided with a first annular self-lubricating sealing surface 19 facing outwardly from first side 26. First sealing surface 19 is preferably provided on a first sealing ring 20 which is generally concentric with first ring member 5. First sealing ring 20 is held in place by a first means 21 for holding a sealing ring, preferably comprising first groove 22, having a base 23 and a first o-ring 24 interposed between base 23 and first sealing ring 20. First ring member 5 is provided with a second annular self-lubricating sealing surface 28 facing outwardly from second side 27. Second sealing surface 28 is preferably provided on a second sealing ring 29, also generally concentric with first ring member 5. Second sealing ring 29 is held in place by a second means 30 for holding a sealing ring, preferably comprising second groove 31, having a base 32 and a second o-ring 33 interposed between base 32 and second sealing ring 29. Sealing rings 20,29 are held in a substantially non-rotatable position with respect to first member 5 by grooves 22,31 and by the pressure exerted by o-rings 24,33 when the seal 1 is assembled.

Second ring member 18 has a first fixed annular surface 25 facing first sealing surface 19, and a second fixed annular surface 24 facing second sealing surface 28. Second fixed annular surface 34 is preferably provided on a backing ring 35. First fixed surface 25 and second fixed surface 34 slidably and sealingly engage first sealing surface 19 and second sealing surface 28, respectively when first member 5 is biased between first fixed surface 25 and second fixed surface 28. As shown in FIGS. 2-4, backing ring 35 is contained against second sealing surface 28 by a lip 36 on second member 18, which is rolled inward over the edge 37 of backing ring 35 to hold it in place. In a test of an experimental seal 1 constructed in accordance with FIG. 2 utilizing glass filled PTFE sealing rings 20,29 and o-rings 24,33, it was found that backing ring 35 need only compress first ring member 5 about 0.010″ from the point of first contact between sealing surfaces 19,28 and fixed surfaces 25,34 in order to obtain an excellent seal.

Installation of the seal 1 shown in FIGS. 24 is simple. The assembled seal 1, with sealing surfaces 19,28 and fixed surfaces 25,34 already engaged, slides over shaft 2 and is forced into recess 17. O-ring 7 provides a tight seal and fit of first member 5 around shaft 2. Thus, as shaft 2 and first member 5 rotate, a double seal is provided between sealing surfaces 19,28 and fixed surfaces 25,34. The invention 1 will function with only one pair of surfaces in contact with each other, and with the other pair replaced by a bearing, bushing or other rotatable connection known in the art.

Figure 5:
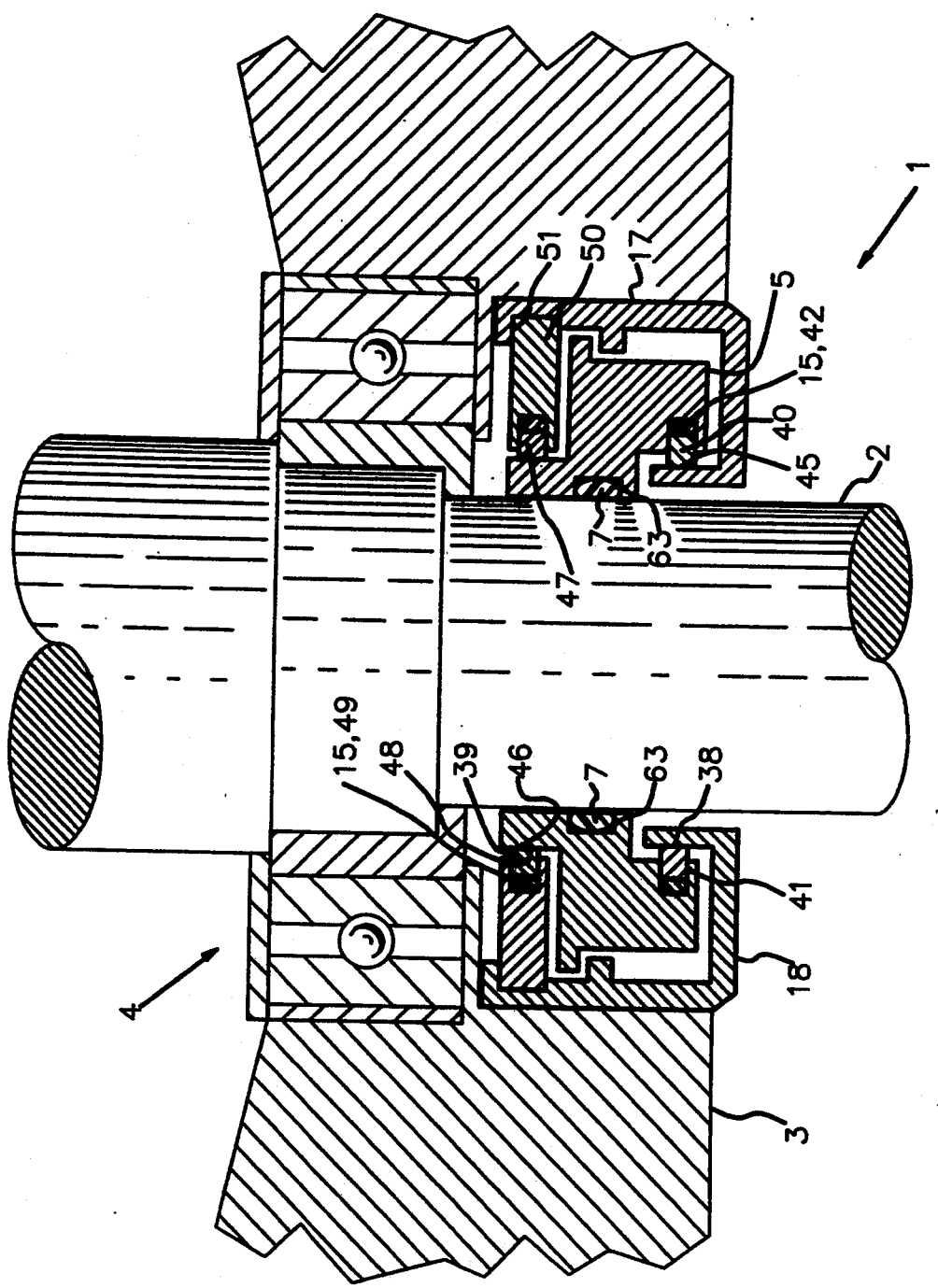
FIG. 5 is a sectional view of an alternate embodiment of the invention installed on a shaft.
Figure 6:
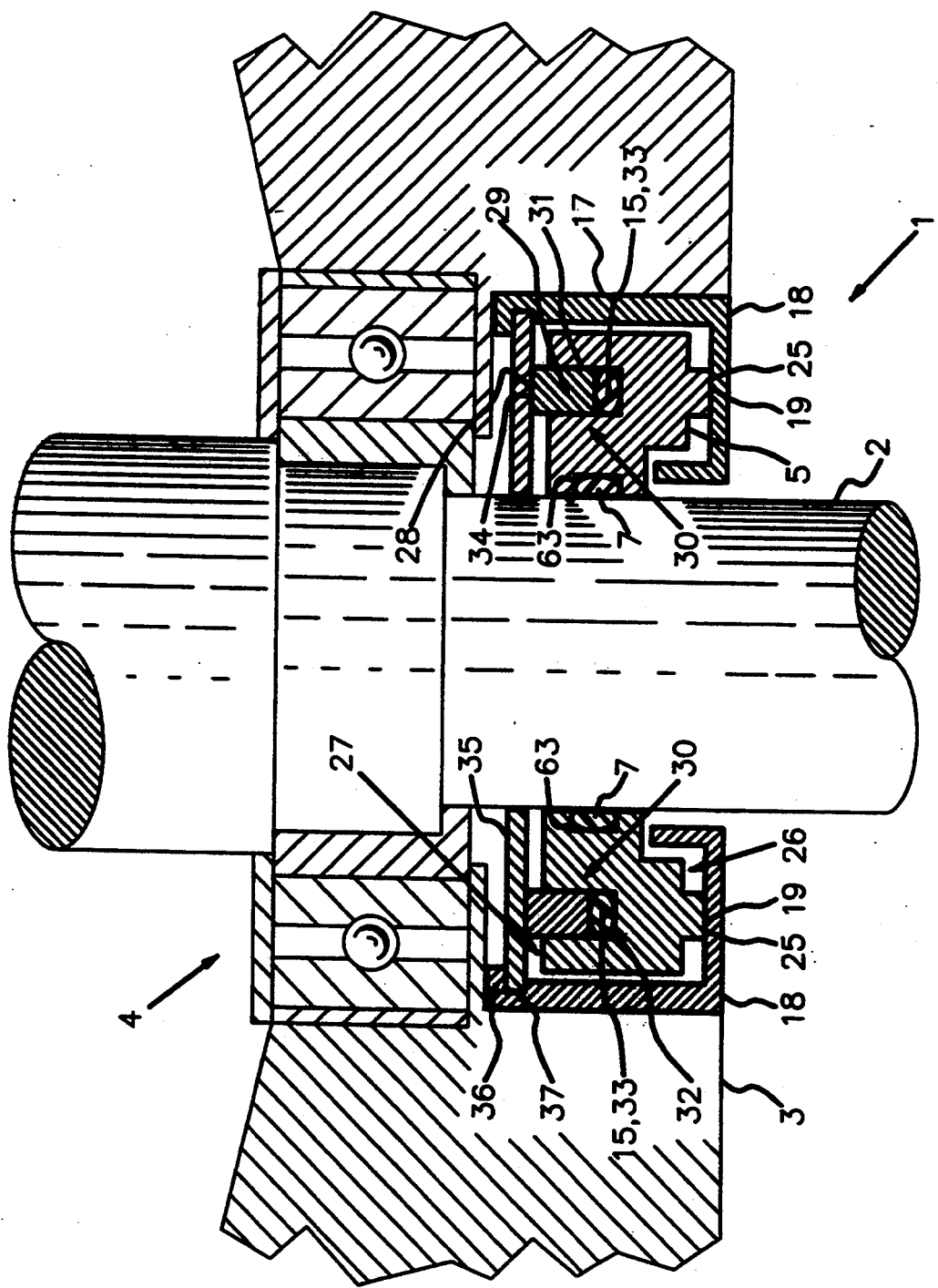
FIG. 6 is a sectional view of another alternate embodiment of the invention installed on a shaft.

Alternate embodiments of the invention 1 are shown in FIGS. 5 and 6. FIG. 5 depicts a version of the seal 1 wherein the sealing surfaces face perpendicularly with respect to shaft 2. As shown, a first ring member 5 is provided with a first annular self-lubricating sealing surface 38 facing perpendicularly toward shaft 2, and a second annular surface 39 facing perpendicularly away from shaft 2. First sealing surface 38 is preferably provided on a first sealing ring 40 which is held in place by first groove 41 and first o-ring 42. A second ring member 18 is provided with a first fixed annular surface 45 facing first sealing surface 38, and a second annular self-lubricating sealing surface 46 facing second annular surface 39. Second sealing surface 46 is preferably provided on a second sealing ring 47 which is held in place by second groove 48 and second o-ring 49. As shown, second ring member 18 includes a backing ring 50 which is held in place by a rolled lip 51. Backing ring 50 must be thick enough to accommodate second groove 48 in the embodiment shown. Thus, first sealing surface 38 is adapted to slidably and sealingly engage first fixed surface 45 and second sealing surface 46 is adapted to slidably and sealingly engage second annular surface 39 when first sealing surface 38 is biased against first fixed surface 45 and when second sealing surface 46 is biased against second annular surface 39. The seal 1 is a cartridge unit and is installed in the same manner as descried previously. Of course, the positions of sealing surfaces 38,46 and annular surfaces 45,39, respectively, may be reversed in order to accomplish the same result.

Figure 7:
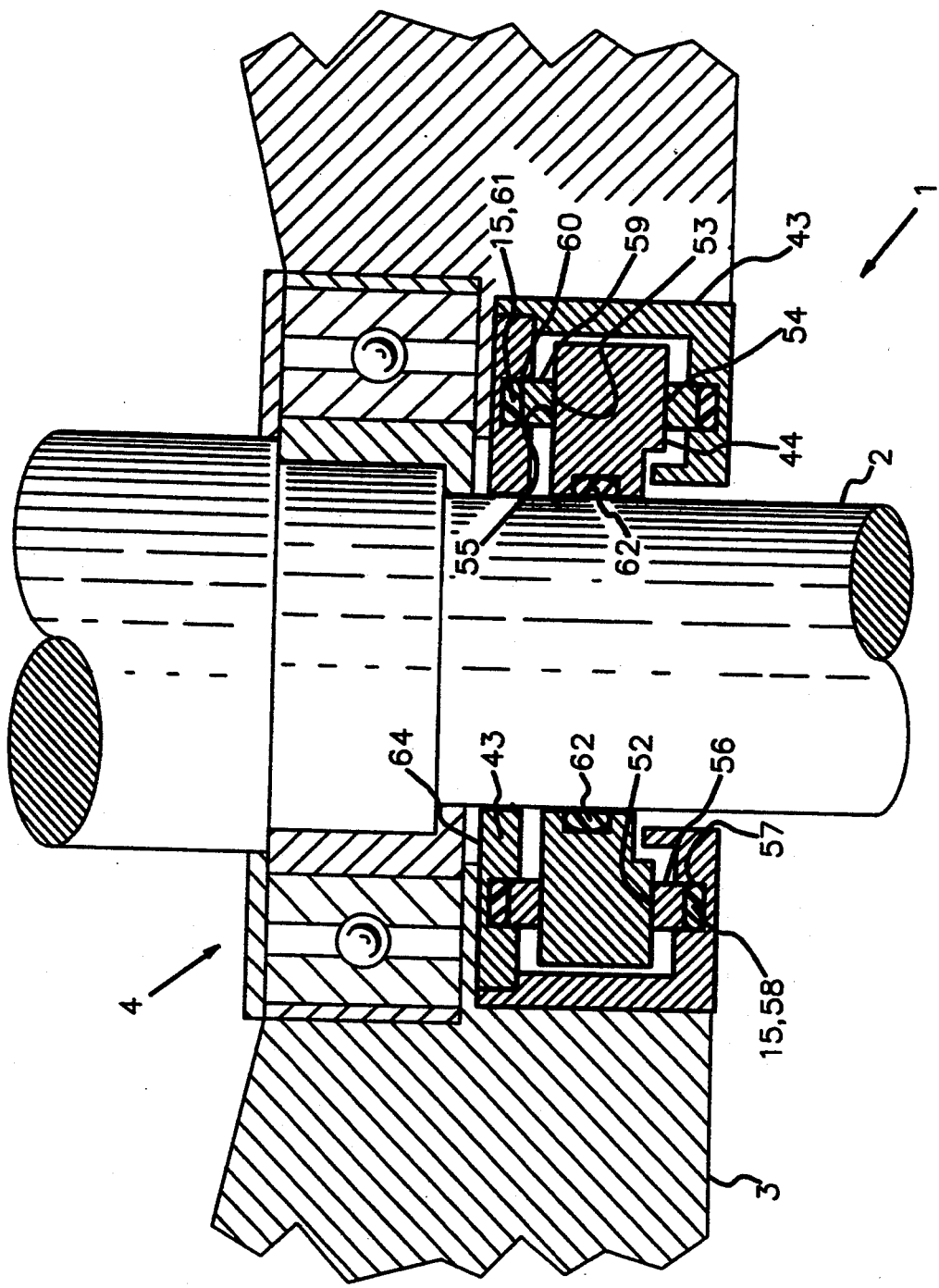
FIG. 7 is a sectional view of still another alternate embodiment of the invention installed on a shaft.

Similarly, the positions of the sealing faces shown in FIG. 2 may be reversed as shown in FIG. 7. In FIG. 7, a first ring member 43 is generally concentric with shaft 2, and is attachable in a non-rotatable position relative to housing 3. First member 43 is provided with a first self-lubricating sealing surface 52 facing away from first member 43, and a second self-lubricating sealing surface 53 facing first sealing surface 52. A second ring member 44, having a first annular surface 54 facing first sealing surface 52 and a second annular surface 55 facing second sealing surface 53, is non-rotatably attachable to shaft 2 by a means such as o-ring 62. Preferably, a first sealing ring 56 is provided in first annular groove 57, backed by first o-ring 58. Similarly, a second sealing ring 59 is provided in second annular groove 60, backed by second o-ring 61. In this embodiment, sealing surfaces 52,53 remain stationary and slidably and sealingly engage rotatable annular surfaces 54,55. First ring member 43 may include a backing ring 64 which supports second sealing ring 59 and maintains a desired compression between sealing surfaces as discussed above.

The alternate embodiment shown in FIG. 6 illustrates the many possible embodiments of the invention. FIG. 6 is the same as FIG. 2, except that the entire first ring member 5 is constructed of a fluoroplastic material, such as glass filled PTFE, eliminating the need for first sealing ring 20. Other alternate embodiments of the invention will occur to those skilled in the art, and are intended to be within the scope and spirit of the following claims.

I claim:

1. A seal between a housing and a rotatable shaft, comprising:
    a first ring member generally concentric with a rotatable shaft, said first ring member being attachable to said shaft in a non-rotatable position relative to said shaft, said first ring member further having:
    (a) a first side and a second side;
    (b) said first side and said second side each having an annular groove formed therein, and wherein each said annular groove is generally concentric with said shaft and shaped to matingly receive a sealing ring and wherein each said annular groove has a base;
    (c) a pair of sealing rings, one of said sealing ring matingly disposed within each of said annular grooves, and each said sealing ring having an annular self-lubricating sealing surface facing away from said first ring member;
    (d) a pair of resilient members, one of said resilient members interposed within each of said annular grooves between said base and said sealing ring so as to bias said sealing ring away from said base and hold said sealing ring in a non-rotatable position relative to said first ring member;
    a second ring member generally concentric with said rotatable shaft, said second ring member being attachable to a housing in a non-rotatable position relative to said housing, said second ring member further having a pair of annular surfaces fixed with respect to said housing, said pair of annular surfaces facing said sealing surfaces of said sealing rings; and
    wherein said fixed annular surfaces are adapted to slidably and sealingly engage said sealing surfaces when said sealing rings are biased toward said fixed annular surfaces.

2. The seal according to claim 1, wherein said self-lubricating sealing surfaces are constructed of a fluoroplastic material.

3. The seal according to claim 2, wherein said fluoroplastic material is polytetrafluoroethylene.

4. The seal according to claim 2, wherein said fluoroplastic material includes structural reinforcing aggregate.

5. The seal according to claim 2, wherein said fluoroplastic material is glass-filled polytetrafluoroethylene.

* * * * *